(12) United States Patent
Su (10) Patent No.: US 11,041,482 B2
(45) Date of Patent: Jun. 22, 2021

(54) WIND-DRIVEN GENERATOR AND IMPELLER LOCKING DEVICE FOR WIND-DRIVEN GENERATOR

(71) Applicant: BEIJING GOLDWIND SCIENCE & CREATION WINDPOWER EQUIPMENT CO., LTD., Beijing (CN)

(72) Inventor: Zhennian Su, Beijing (CN)

(73) Assignee: Beijing Goidwind Science & Creation Windpower Equipment Co., Ltd., Beijing (CN)

( * ) Notice: Subject to any disclaimer, the term of this patent is extended or adjusted under 35 U.S.C. 154(b) by 189 days.

(21) Appl. No.: 14/427,869

(22) PCT Filed: Nov. 26, 2013

(86) PCT No.: PCT/CN2013/087877
§ 371 (c)(1),
(2) Date: Mar. 12, 2015

(87) PCT Pub. No.: WO2014/082568
PCT Pub. Date: Jun. 5, 2014

(65) Prior Publication Data
US 2015/0260164 A1    Sep. 17, 2015

(30) Foreign Application Priority Data
Nov. 29, 2012 (CN) .......................... 201220644683.0

(51) Int. Cl.
*F03D 80/50* (2016.01)
*F03D 7/02* (2006.01)
(Continued)

(52) U.S. Cl.
CPC ................. *F03D 9/25* (2016.05); *F03D 1/06* (2013.01); *F03D 7/0244* (2013.01);
(Continued)

(58) Field of Classification Search
CPC . F03D 11/00; F03D 9/25; F03D 80/00; F03D 80/50; F03D 7/0264; F03D 7/0268;
(Continued)

(56) References Cited

U.S. PATENT DOCUMENTS 3,732,752 A * 5/1973 Louckes ................. F16H 48/24
                                                                    475/150
6,971,351 B2 * 12/2005 Kinugawa ............... F01L 1/022
                                                                    123/90.15
(Continued)

FOREIGN PATENT DOCUMENTS

CN        101535635 A    9/2009
CN        201496211 U    6/2010
(Continued)

OTHER PUBLICATIONS

Peters—DE102007035598 A1—Wind energy installation comprises a locking element—Google Patents English Translation.*
(Continued)

*Primary Examiner* — Christopher Verdier
*Assistant Examiner* — Brian Christopher Delrue
(74) *Attorney, Agent, or Firm* — Finnegan, Henderson, Farabow, Garrett & Dunner, LLP (57) ABSTRACT

An impeller locking device for a wind generator is provided. The impeller locking device includes a locking hole formed on an impeller connecting disc, and a locking pin configured to fit into the locking hole. The locking pin is connected with a base of the wind generator; and when the locking pin is locked in the locking hole, a radial clearance is provided between the locking pin and the locking hole. When the axes of the locking pins and the locking holes are deviated radially, the locking pins can also be inserted into the locking holes, so that radial constraints of the locking pins and the locking holes are eliminated. A wind generator adopting the impeller locking device is further provided.

16 Claims, 11 Drawing Sheets

(51) Int. Cl.
*F03D 9/25* (2016.01)
*F03D 1/06* (2006.01)
*F03D 80/00* (2016.01)

(52) U.S. Cl.
CPC ........... *F03D 7/0248* (2013.01); *F03D 80/00* (2016.05); *F03D 80/50* (2016.05); *F05B 2260/30* (2013.01); *F05B 2260/301* (2013.01); *F05B 2260/902* (2013.01); *Y02E 10/72* (2013.01); *Y10T 74/20636* (2015.01)

(58) Field of Classification Search
CPC ........ F03D 13/00; F03D 13/10; F03D 7/0244; F03D 7/0248; Y10T 74/20636; Y10T 74/2063; Y10T 83/4556; Y10T 83/8699; Y10T 137/2842; F05B 2260/30; F05B 2260/301; F05B 2260/90; F05B 2260/902; Y02E 10/72
USPC .......... 416/75, 167, 169, 200, 146 R, 244 R, 416/244 A
See application file for complete search history.

(56) References Cited

U.S. PATENT DOCUMENTS

| | | | | |
|---|---|---|---|---|
| 8,120,198 B2* | 2/2012 | Pabst | ...................... | H02K 7/10 290/55 |
| 2010/0021299 A1 | 1/2010 | Aarhus et al. | | |
| 2010/0202884 A1 | 8/2010 | Wedekind et al. | | |
| 2011/0123339 A1* | 5/2011 | Eriksen | ................. | F03D 7/0248 416/169 R |
| 2011/0135481 A1* | 6/2011 | Koronkiewicz | ........ | F03D 15/00 416/220 R |
| 2012/0181792 A1* | 7/2012 | Pettersen | ............. | H02K 7/1838 290/55 |
| 2014/0010656 A1* | 1/2014 | Nies | ...................... | F03D 7/0244 416/204 R |

FOREIGN PATENT DOCUMENTS

| | | | | |
|---|---|---|---|---|
| CN | 201843735 U | | 5/2011 | |
| CN | 201918134 U | | 8/2011 | |
| CN | 102235312 A | | 11/2011 | |
| CN | 102251936 A | | 11/2011 | |
| CN | 102330644 A | | 1/2012 | |
| CN | 102182647 B | | 8/2012 | |
| CN | 202468172 U | * | 10/2012 | |
| CN | 202926533 U | | 5/2013 | |
| CN | 203039518 U | * | 7/2013 | |
| DE | 10 2007 0355 598 A1 | | 2/2009 | |
| DK | 102007035598 A1 | * | 2/2009 | ............... F03D 7/00 |

OTHER PUBLICATIONS

English-language International Search Report from the State Intellectual Property Office of the Peoples Republic of China for International Application No. PCT/CN2013/087877 dated Jan. 30, 2014.

* cited by examiner

Figure 1

Prior Art

Figure 2

Prior Art

Figure 3

Prior Art

WIND-DRIVEN GENERATOR AND IMPELLER LOCKING DEVICE FOR WIND-DRIVEN GENERATOR

CROSS REFERENCE TO RELATED APPLICATIONS

This application is the national phase of International Application No. PCT/CN2013/087877, titled "WIND-DRIVEN GENERATOR AND IMPELLER LOCKING DEVICE FOR WIND-DRIVEN GENERATOR", filed on Nov. 26, 2013, which claims the benefit of priority to Chinese patent application No. 201220644683.0 titled "WIND GENERATOR AND ROTOR LOCKING DEVICE FOR WIND GENERATOR" and filed with the Chinese State Intellectual Property Office on Nov. 29, 2012, entire disclosures of both applications are incorporated herein by reference.

TECHNICAL FIELD

The present application relates to the field of wind power generation, and more particularly to a wind generator and a rotor locking device for wind generators.

BACKGROUND

When it is required to assemble a wind generator or maintain components in a rotor of the wind generator, maintenance personnel needs to brake the rotor to stop its rotation and lock the rotor to keep its position fixed before entering the rotor for maintenance.

Figure 1:
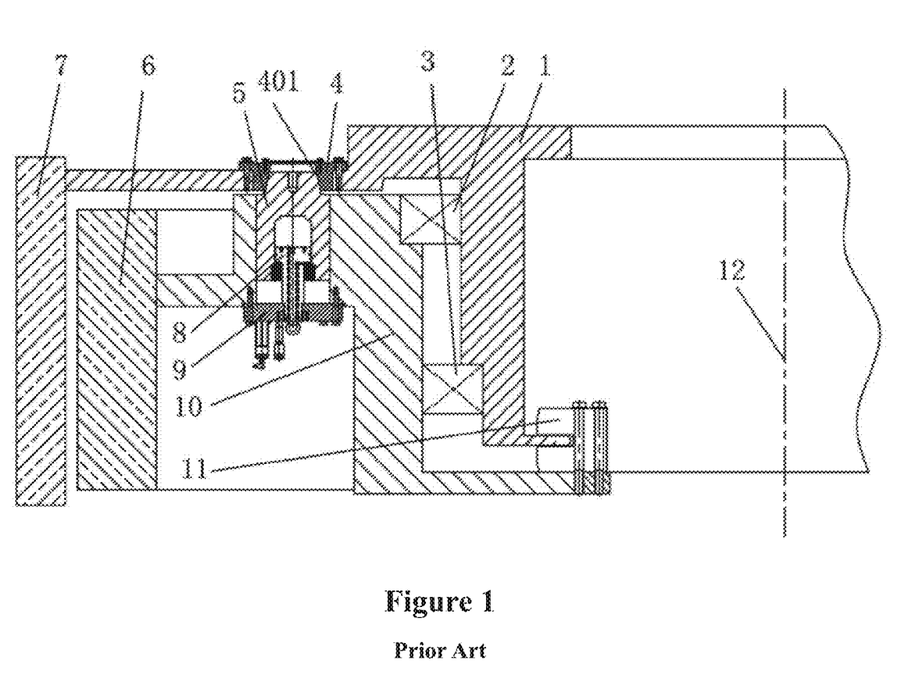
FIG. 1 is a schematic structural view of a rotor locking device in the conventional technology.

Currently, locking pins are usually used to lock the rotor, and hydraulic rotor locking devices are widely used. As shown in FIG. 1, the relative position between the rotor and the rotor connecting disc 1 is fixed. The rotor connecting disc 1 is rotatably mounted on a base 10 of a wind generator via a first main bearing 2 and a second main bearing 3. The base 10 is fixedly connected to a rotating shaft 12. A generator rotor 7 is fixedly connected at an end of the rotor connecting disc 1, while a generator stator 6 is fixedly connected to the base 10. The rotor connecting disc 1 drives the generator rotor 7 to rotate with respect to the generator stator 6, thereby achieving energy conversion. A brake 11 is secured to the base 10, and the brake 11 is also located at an edge of the rotor connecting disc 1 to brake the rotor connecting disc 1. A locking sleeve 4 is arranged on the rotor connecting disc 1, the locking sleeve 4 is provided with a locking hole 401, and the locking pin 5 configured to fit into the locking hole 401 is connected to the base 10. A piston 8 is mounted on the locking pin 5 to drive the locking pin 5 to move, and the piston 8 is further supported by a locking pin mounting plate 9 fixedly connected to the base 10.

When performing maintenance on the rotor, in a case that a rotating speed of the rotor connecting disc 1 is lower than 1 rpm, the brake 11 starts to brake by clamping the edge of the rotor connecting disc 1 tightly, to stop the rotation of the rotor connecting disc 1 by friction generated between the brake 11 and the rotor connecting disc 1. In this process, it is preferable to align an axis of the locking hole 401 with an axis of the locking pin 5 when the rotor connecting disc 1 stops rotating, and then lock the rotor. In the locking process, hydraulic oil flows into a front cavity of the locking pin 5 and then pushes the locking pin 5 into the locking hole 401 under the action of the hydraulic press to fixedly connect the rotor connecting disc 1 to the base 10, thereby locking and positioning the rotor. In the unlocking process, the hydraulic oil flows into a rear cavity of the locking pin 5, and the locking pin 5 is released from the locking sleeve 4 at the same time, and the brake 11 is released, thus, the rotor can rotate again.

Figure 2:
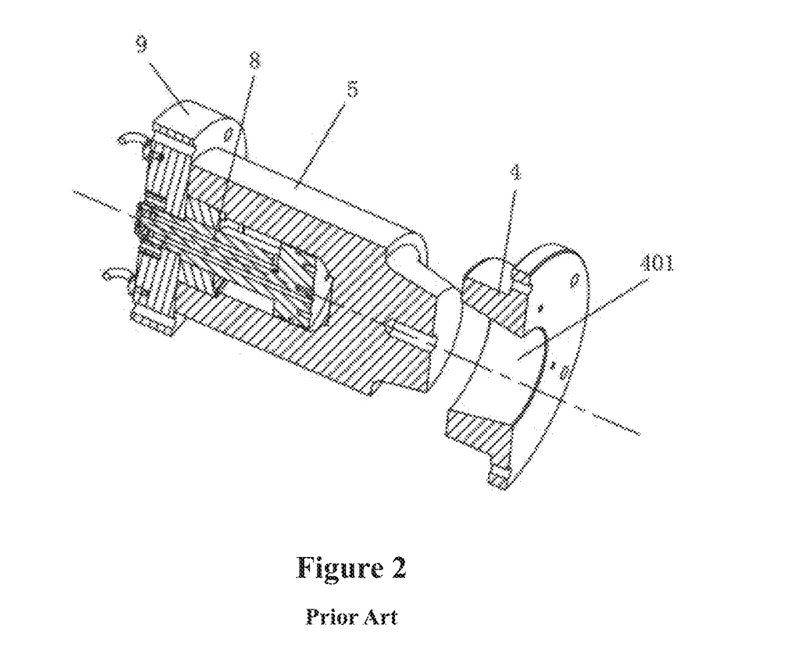
FIG. 2 is a schematic structural view of a locking pin and a locking sleeve shown in FIG. 1.

As shown in FIG. 2, the locking pin 5 is of a cone frustum shape, and accordingly the locking hole 401 on the locking sleeve 4 is also of a cone frustum shape. If the axis of the locking pin 5 is not exactly aligned with the axis of the locking hole 401 after the rotor is stopped, a head portion of the cone frustum of the locking pin 5 can also be pushed into the locking hole 401 to exactly align their axes since a certain radial clearance is provided between their adjacent surfaces. After the locking pin 5 is completely pushed into the locking sleeve 4, the head portion of the cone frustum of the locking pin 5 perfectly fits with the locking hole 401.

Figure 3:
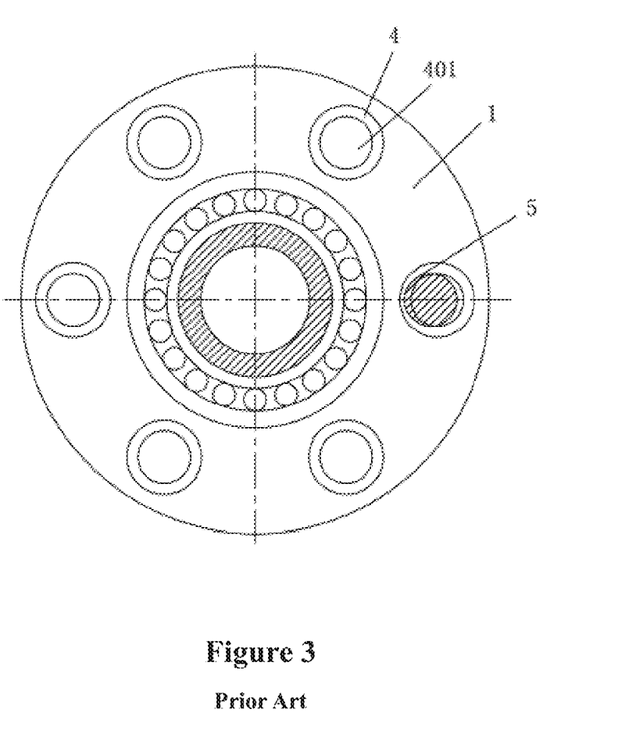
FIG. 3 is a schematic view showing the assembling state of the locking pin and the locking sleeve shown in FIG. 1.

In the locking process, the rotor connecting disc 1 has only one circumferential degree of freedom. The locking pin 5 can be pushed into the locking sleeve 4 successfully to lock the rotor, so long as the axes of the locking pin 5 and the locking hole 401 are aligned. However, since errors are unavoidable during manufacturing and installation process, a radial error will unavoidably exist between the axes of the locking pin 5 and the locking sleeve 4, as shown in FIG. 3, which will cause difficulties in locking the rotor. Furthermore, in the process being pushed into the locking hole 401, the locking pin 5 suffers from a large lateral force, which even results in deformation of the head portion of the cone frustum of the locking pin 5. In this case, it is highly possible that the locking pin 5 cannot be released from the locking sleeve 4 successfully and gets stuck during the unlocking process, as a result of which the wind generator may fail to operate normally. To solve this problem, it is required to disassemble the locking pin 5, the disassemble process is very difficult and may take several days, leading to increase of maintenance cost and power generation loss due to the downtime. In addition, when the locking pin 5 gets stuck, the radial load on the main bearings will be increased, which may cause damage to the main bearings and reduce their service life.

Therefore, a technical problem to be solved by those skilled in the art is to lock the rotor successfully and prevent the locking pin from being stuck.

SUMMARY

An object of the present application is to provide a rotor locking device for a wind generator to lock a rotor and avoid deadlock. In addition, another object of the present application is to provide a wind generator with the above rotor locking device.

To realize the above objects, a rotor locking device is provided according to the present application. The rotor locking device includes a locking hole provided on a rotor connecting disc and a locking pin configured to fit into the locking hole, and the locking pin is connected to a base of the wind generator, wherein in a case that the locking pin is locked in the locking hole, a radial clearance is provided between the locking pin and the locking hole in a radial direction of the rotor connecting disc, thus the locking pin will not contact the locking hole in the radial direction of the rotor connecting disc.

Preferably, a locking sleeve is fixedly connected to the rotor connecting disc, and the locking hole is formed on the locking sleeve.

Preferably, an end of the locking pin that is configured to fit into the locking hole is of a wedge shape.

Preferably, two outer surfaces of the locking pin which are parallel to the radial direction of the rotor connecting disc are inclined surfaces.

Preferably, the locking hole and the end of the locking pin that is configured to fit into the locking hole each have a rectangular cross section.

Preferably, in a case that the locking pin is locked in the locking hole, the locking hole and the locking pin have the same size on the same cross-section in a direction perpendicular to the radial direction of the rotor connecting disc.

Preferably, the rotor locking device may further include a limiting device for limiting a circumferential rotation of the locking pin, to keep an outer circumference of the locking pin within an inner circumference of the locking hole.

Preferably, the rotor locking device may further include a locking pin mounting plate fixedly connected to the base, wherein the limiting device is arranged on the locking pin mounting plate and the locking pin.

Preferably, the limiting device includes a limiting rod, the limiting rod runs through the locking pin mounting plate through the limiting hole and has a top end fixedly connected to the locking pin.

Preferably, a protection cover is mounted at a bottom end of the limiting rod.

Preferably, a diameter of the limiting hole on the locking pin mounting plate is greater than a diameter of the limiting rod.

In addition, a wind generator is further provided according to the present application, which includes a base, and the above-described rotor locking device is connected to the base.

When locking the rotor, even if the axes of the locking pin and the locking hole are not aligned and have a radial deflection due to a tooling error after the rotor is stopped by the brake, the locking pin can still be inserted into the locking hole to lock the rotor since a radial clearance is provided between the adjacent surfaces of the locking pin and the locking hole. After the rotor being locked, there is a proper clearance between the outer surface of the locking pin and the inner surface of the locking hole in the radial direction.

In the rotor locking device of the present application, by providing the radial clearance between the locking pin and the locking hole, the rotor can still be locked successfully even when a radial deflection exists between the axes of the locking pin and the locking hole, therefore, the radial constraints during the locking process are eliminated. Besides, the locking pin and the locking hole will not be deformed, and the locking pin will not be stuck, that is, the problem that the locking pin cannot be released will not happen and no additional load will be imposed on the main bearings.

In another preferable embodiment, the rotor locking device of the present application further includes a limiting device for limiting the circumferential movement of the locking pin. Under the action of the limiting device, the outer circumference of the locking pin is always located within the outer circumference of the locking hole, which can prevent a problem that the locking pin cannot fit into the locking hole normally due to the circumferential rotation of the locking pin.

In the conventional technology, the locking sleeve needs to be frozen since the locking sleeve is an eccentric element and the position of the locking sleeve needs to be adjusted when it is mounted with the locking hole. When the new locking pin of the present application is applied, a freezer for freezing the locking sleeve is not required, and barring electro-mobile and coaxial debugging are not required for installation of the locking sleeve, which can simplify the installation process, shorten the assembly time and reduce the assembly cost.

Besides, the wind generator provided according to the present application has the same technical effects as the rotor locking device described above, thus will not be described in detail herein.

BRIEF DESCRIPTION OF THE DRAWINGS

These and/or other aspects and advantages of the present application will become more apparent and easier to understand with reference to the following description of embodiments in conjunction with the accompanying drawings, wherein.

DETAILED DESCRIPTION

Embodiments of the present application are described in detail as below with the examples illustrated in the accompanying drawings, in which one reference numeral always indicates the same part.

Embodiments are described as follows in conjunction with the accompanying drawings to explain the present application.

Figure 4:
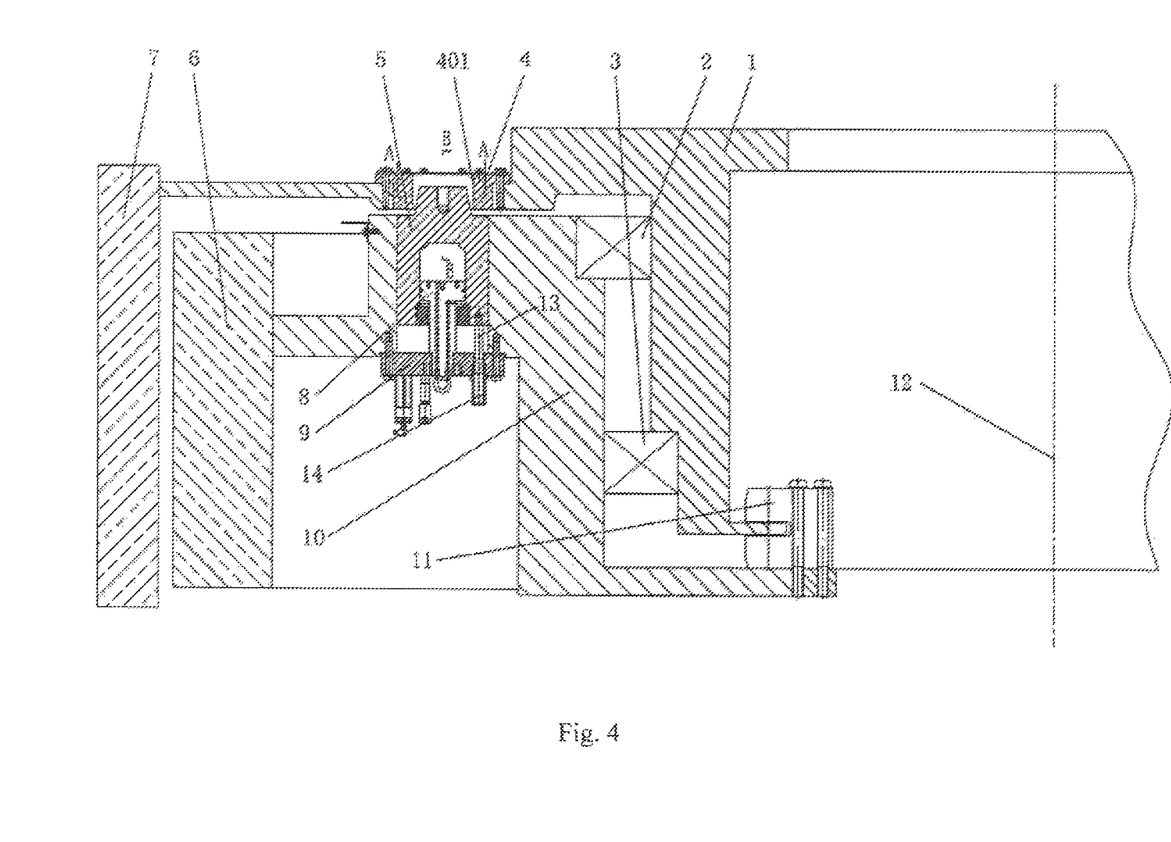
FIG. 4 is a schematic structural view of a rotor locking device according to an embodiment of the present application.

Reference is made to FIG. 4, wherein FIG. 4 is a schematic structural view of a rotor locking device according to an embodiment of the present application.

According to an embodiment of the present application, a wind generator includes a rotor connecting disc 1 which is rotatably mounted on a base 10 of a rotating shaft 12 of the wind generator via a first main bearing 2 and a second main bearing 3. The rotor connecting disc 1 is further connected to a generator rotor 7 of the wind generator, to drive the generator rotor 7 to rotate with respect to a generator stator 6, thereby converting wind energy to electric power. A locking hole 401 is formed on the rotor connecting disc 1, a locking pin 5 configured to fit into the locking hole 401 is mounted below the locking hole 401 and connected to the base 10 of the wind generator.

The locking pin 5 may be arranged between the base 10 and the generator stator 6, and a piston 8 is fixedly connected to the base 10 via a locking pin mounting plate 9. Two oil cavities, i.e. a front cavity and a rear cavity, which are formed by the piston 8 and the locking pin 5, are filled with hydraulic oil, and the locking pin 5 is movable up and down in the locking hole 401 under the action of the hydraulic pressure. That is, the locking pin 5 may have two degrees of freedom, including a degree of freedom in an up-and-down linear motion and a degree of freedom in a circumferential rotation.

A top end of the locking pin 5 is a push-in end configured to fit into the locking hole 401. When the push-in end is completely pushed into the locking hole 401, that is, the locking pin 5 is locked into the locking hole 401, a radial clearance is provided between the locking pin 5 and the locking hole 401 in a radial direction of the rotor connecting disc 1, thus the locking pin 5 is not in contact with the locking hole 401 in the radial direction of the rotor connecting disc 1, which means that, the locking pin 5 can move along the radial direction of the rotor connecting disc 1 with respect to the locking hole 401.

In addition, a locking sleeve 4 may be installed on the rotor connecting disc 1 and the locking hole 401 is provided on the locking sleeve 4. The locking sleeve 4 may be made of a material having higher strength than the rotor connecting disc 1. In this way, direct contact between the locking pin 5 and the rotor connecting disc 1 may be avoided, thereby preventing the locking pin 5 from damaging the rotor connecting disc 1 during the locking state.

Figure 5:
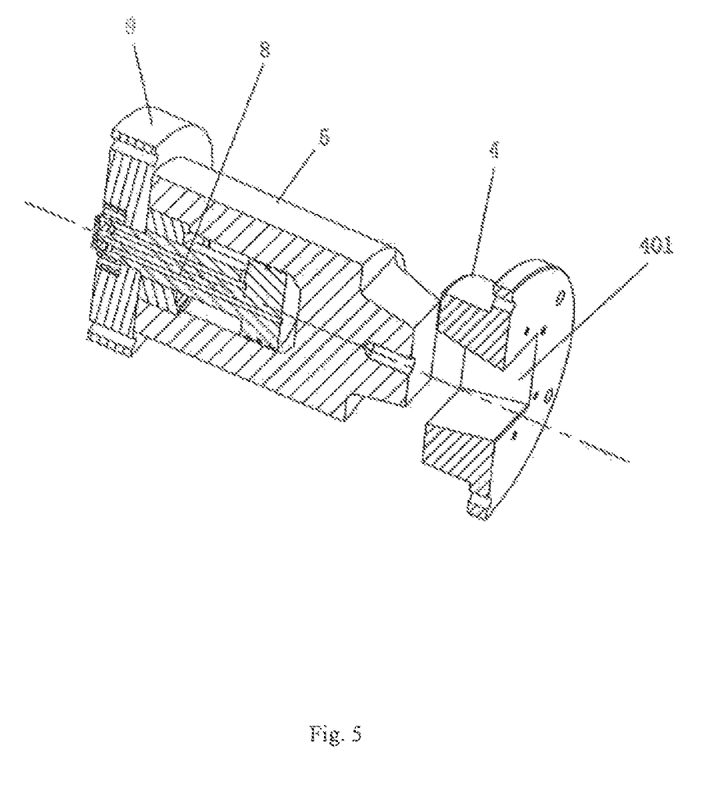
FIG. 5 is a schematic structural view of a locking pin and a locking sleeve shown in FIG. 4.

The locking hole 401 and the locking pin 5 configured to fit into the locking hole 401 may be embodied as various shapes. For example, the end (the push-in end) of the locking pin 5 configured to fit into the locking hole 401 may be of a wedge shape (certainly, the wedge shape has a thickness gradually reducing from bottom to top), as shown in FIG. 5. That is, the locking pin 5 has four outer surfaces, two opposite outer surfaces are parallel to the radial direction of the rotor connecting disc 1, and the other two outer surfaces are perpendicular to the radial direction of the rotor connecting disc 1. The locking hole 401 may be in any shape that allows the insertion of the locking pin 5, as long as a radial clearance is provided between the locking hole 401 and the locking pin 5 and the locking pin 5 does not contact the locking hole 401 in the radial direction of the rotor connecting disc 1. In this case, one or more of the four outer surfaces of the locking pin 5 may be inclined surface. In one embodiment, two outer surfaces of the locking pin 5 which are parallel to the radial direction of the rotor connecting disc 1 may be inclined surfaces, and the locking hole 401 may be of wedge shape configured to cooperate with the locking pin 5 or can be cylindrical, thus, in the process of inserting the locking pin 5, a certain clearance is provided between the locking pin 5 and the locking hole 401 in the direction perpendicular to the radial direction of the rotor connecting disc 1, and the locking pin 5 can be easily inserted into the locking hole 401.

In addition to the above-described shapes, the locking hole 401 and the end of the locking pin 5 that is configured to fit into the locking hole 401 may both have a rectangular cross section. In this way, both the locking pin 5 and the locking hole 401 may be of a cuboid shape. Similarly, without affecting the normal locking, the size of the locking pin 5 may be slightly smaller than that of the locking hole 401, thus the locking pin 5 may be easily inserted into the locking hole 401.

Figure 6:
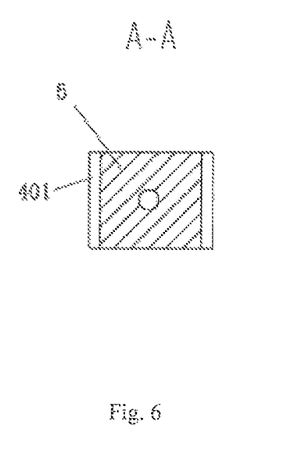
FIG. 6 is a schematic sectional view taken along line A-A in FIG. 4.
Figure 7:
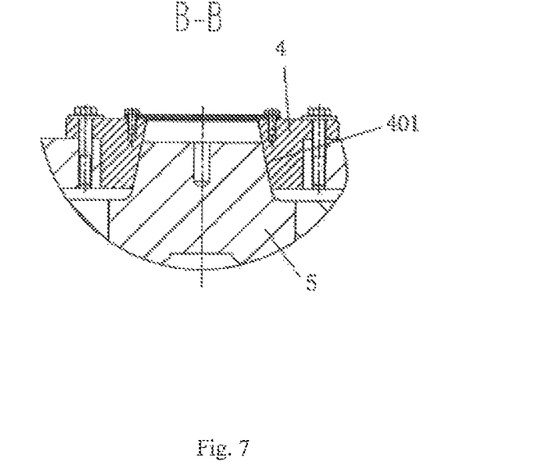
FIG. 7 is a schematic sectional view taken along line B-B in FIG. 4.
Figure 8:
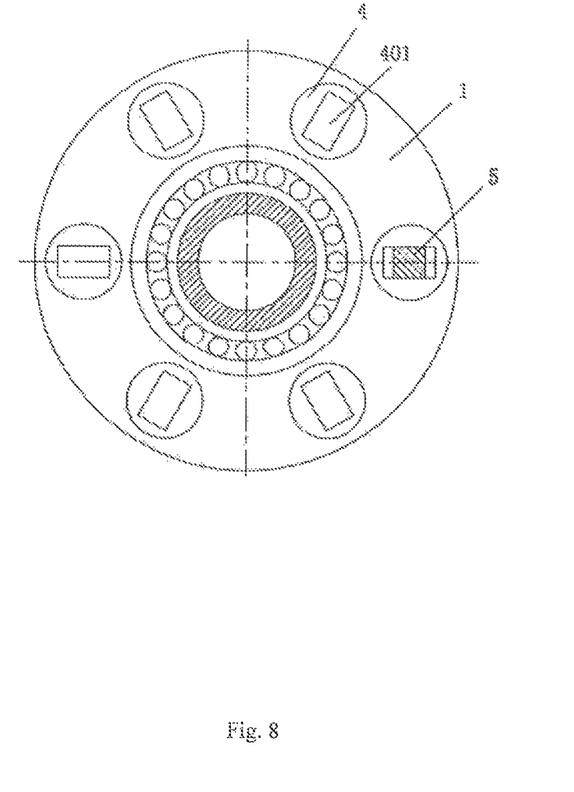
FIG. 8 is a schematic view showing the assembling state of the locking pin and the locking sleeve shown in FIG. 4.

For any shape described above, when the locking pin 5 is pushed into the locking hole 401, in the same cross section in the radial direction of the rotor connecting disc 1, the locking pin 5 has a length smaller than a length of the locking hole 401, so as to ensure that a certain clearance is provided between the outer surface of the locking pin 5 and the surface of the locking hole 401 in the radial direction, as shown in FIG. 6. Different from the forms above, the size (or the length) of the locking pin 5 may be identical with the size (or the length) of the locking hole 401 in the direction perpendicular to the radial direction of the rotor connecting disc 1, as shown in FIG. 7 and FIG. 8. Thus, the locking pin 5 can perfectly fit into the locking hole 401 in that direction, and the contact area between the locking pin 5 and the locking hole 401 is largest, which may facilitate improving the stability and reliability of the locking process.

In the present application, the rotor locking device may include multiple sets of the locking pin 5 and the locking hole 401 which cooperate with each other. The shapes of the locking pins 5 may be identical and the shapes of the locking holes 401 may also be identical. There is a radial clearance between the locking pin 5 and the locking hole 401 in each set, which cooperate with each other, in the radial direction of the rotor connecting disc 1, and the locking hole 5 does not contact the respective locking hole 401 in the radial direction, thus all locking pins 5 can be smoothly inserted into their respective locking holes 401 at the same time.

When it is required to lock the rotor, the wind generator is firstly stopped and when the rotating speed of the rotor connecting disc 1 is less than 1 rpm, the rotor connecting disc 1 is braked by the brake 11. It is preferable to align the axis of the locking hole 401 with the axis of the locking pin 5 when the rotor connecting disc 1 is stopped. Then, the piston 8 is controlled to allow the hydraulic oil to flow into the front cavity of the locking pin 5, and the locking pin 5 is pushed into the locking hole 401 under the action of the hydraulic pressure to lock the rotor connecting disc 1.

After the rotor connecting disc 1 is stopped, even if a radial deflection exists between the axis of the locking hole 401 and the axis of the locking pin 5 due to manufacturing or installation error or other reasons, the locking pin 5 can still be pushed into the locking hole 401 to lock the rotor connecting disc 1 since the radial clearance exists between the locking hole 401 and the locking pin 5. Thus, radial constraints in the locking process are eliminated.

For the rotor locking device in the present application, the radial clearance is provided between the locking pin 5 and the locking hole 401 to ensure that the locking pin 5 can be pushed into the locking hole 401 successfully even in a case that a radial error exits between the axes of the locking hole 401 and the locking pin 5. Besides, the locking pin 5 will not be deformed in the pushing or locking process, which prevents the locking pin 5 from being stuck, and also facilitates reducing the lateral force on the main bearings to some extent, thereby increasing the service life of the main bearings.

When the locking pin 5 and the locking hole 401 are of wedge shape or other non-revolution shapes, the locking pin 5 can rotate without control as it has a circumferential degree of freedom. Therefore, even if the axis of the locking pin 5 is aligned with that the axis of the locking hole 401, an angular error might still exist between the outer surface of the locking pin 5 and the inner surface of the locking hole 401. In this case, if the angular error between the two surfaces is not large, that is, the outer circumference of the locking pin 5 is located within the inner circumference of the locking hole 401 when viewed axially, then when being pushed, the locking pin 5 can adjust its own angle automatically by contacting the locking hole 401. Thus, when being completely pushed into the locking hole 401, the outer surface of the locking pin 5 fits with the surface of the locking hole 401.

Figure 9:
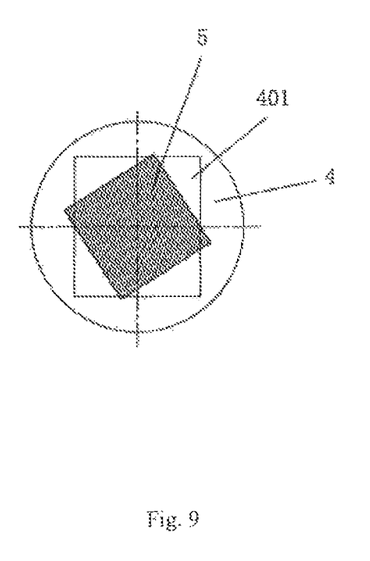
FIG. 9 is a schematic top view showing the relative position relationship between the locking pin and the locking hole after the locking pin has completed a circumferential rotation with respect to the locking hole according to another embodiment of the present application.

However, if the locking pin 5 deflects from the locking hole 401 by a large angle, that is, a portion of the outer circumference of the locking pin 5 is located outside the inner circumference of the locking hole 401, for example, when they are positioned as shown in FIG. 9, it is highly possible that the locking pin 5 cannot be pushed into the locking hole 401 smoothly. To solve this problem, the rotor locking device in another embodiment of the present application further includes a limiting device, which is configured to limit the circumferential rotation of the locking pin 5, to ensure that the locking pin 5 is always located within the range of the locking hole 401. The term "limiting" herein has two meanings, one is that the locking pin 5 is locked at a certain circumferential position where it can only move up and down; and the other is that the locking pin 5 can rotate freely within a small range. Further, the limiting device is arranged on the locking pin 5 and the locking pin mounting plate 9 fixedly connected to the base 10.

Specifically, the limiting device may include a limiting rod 13. The limiting rod 13 runs through the locking pin mounting plate 9 and has a top end inserted into a bottom end of the locking pin 5 and fixedly connected to the locking pin 5. Besides, the limiting rod 13 shall have a certain length, which can ensure that the bottom of the limiting rod 13 will not be released from the locking pin mounting plate 9 after the limiting rod 13 is adjusted to a suitable locking position with the locking pin 5. If such limiting rod 13 has only one degree of freedom in the up-and-down linear motion, the locking pin 5 will be accordingly locked at a certain circumferential position. For the situation that the locking pin 5 is locked at a certain circumferential position, the limiting device of the present application is not limited to this and can be embodied as other forms. For example, the limiting device may be a bolt having a top end directly screwed into the locking pin 5 and a bottom end running through the locking pin mounting plate 9. Alternatively, the bottom end of the bolt may also be connected to a suitable position on the base 10 on the condition that the normal upward pushing and locking of the locking pin 5 will not be affected. In addition, the limiting rod 13 and the locking pin mounting plate 9 may also be fixedly connected, and the length of the limiting rod 13 may be adjustable, such as a telescopic rod, which will not limit the normal pushing of the locking pin 5.

Figure 10:
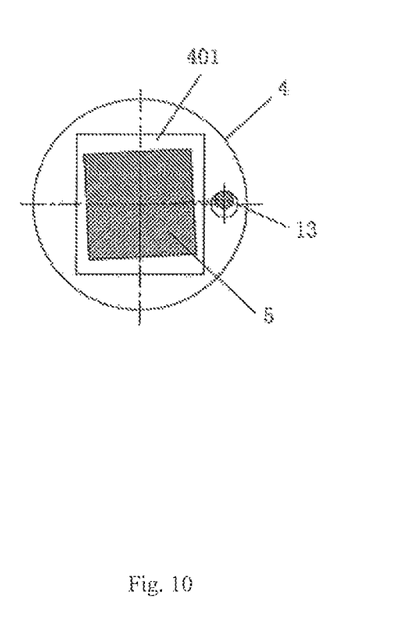
FIG. 10 is a schematic top view showing the relative position relationship of the locking pin, the locking hole, and a limiting device when the locking pin has not been inserted into the locking hole according to another embodiment of the present application.

For facilitating installation of the limiting rod 13, the limiting hole configured to install the limiting rod 13 and arranged on the locking pin mounting plate 9 may have a diameter slightly greater than a diameter of the limiting rod 13. In this case, the locking pin 5 is allowed to rotate in a small angular range, as shown in FIG. 10. Certainly, the outer circumference of the locking pin 5, when rotating to the largest angle, should be located within the inner circumference of the locking hole 401. That is, that angle will not affect the normal pushing and locking of the locking pin 5.

Moreover, a protection cover 14 may be provided at the bottom end of the limiting rod 13 to protect the limiting rod 13.

Figure 11:
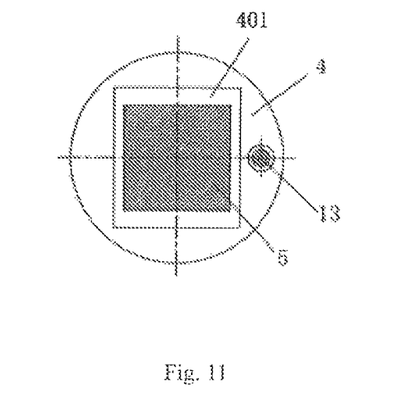
FIG. 11 is a schematic top view showing the relative position relationship of the locking pin, the locking hole, and the limiting device when the locking pin has been completely inserted into the locking hole as shown in FIG. 10.

Under the action of the limiting device, the locking pin 5 will not rotate by a large angle or will be fixed. Even if the locking pin 5 rotates by a small angle as shown in FIG. 10, the locking pin 5 may adjust its angle in the normal pushing process to make the outer surface of the locking pin 5 fit with the inner surface of the locking hole 401, as shown in FIG. 11. At this time, the limiting rod 13 is coaxial with the limiting hole on the locking pin mounting plate 9.

Moreover, a wind generator is further provided according to the present application, and includes a base, the above-described rotor locking device is connected to the base. The wind generator has advantages and features consistent with the above rotor locking device. Other parts of the wind generator are not detailed herein, and can be referred to the conventional technology.

The wind generator and the rotor locking device for wind generators provided in the present application are described in detailed above. Although several embodiments of the present application are shown and described, the person skilled in the art should recognize that several modifications and improvements can be made to these embodiments without deviating from the principle and spirit of the present application limited by the Claims and the equivalent content thereof, and these modifications and improvements are also deemed to fall in the scope of the present application.

The invention claimed is:

1. A rotor locking device for a wind generator, comprising:
   a locking hole provided on a rotor connecting disc and a locking pin configured to fit into the locking hole, and the locking pin being connected to a base of the wind generator, wherein in a case that the locking pin is locked in the locking hole, a radial clearance is provided between the locking pin and the locking hole in a radial direction of the rotor connecting disc,
   a limiting rod for limiting a circumferential rotation of the locking pin, and
   a locking pin mounting plate fixedly connected to the base,
   wherein:
   the limiting rod penetrates the locking pin mounting plate through a limiting hole on the locking pin mounting plate,
   a first end of the limiting rod is inserted into the locking pin, and
   the limiting rod is movable in the limiting hole on the locking pin mounting plate in a longitudinal direction of the limiting rod.

2. The rotor locking device according to claim 1, wherein a locking sleeve is fixedly connected to the rotor connecting disc, and the locking hole is formed on the locking sleeve.

3. The rotor locking device according to claim 1, wherein an end of the locking pin that is configured to fit into the locking hole is of a wedge shape.

4. The rotor locking device according to claim 3, wherein two outer surfaces of the locking pin which are parallel to the radial direction of the rotor connecting disc are inclined surfaces.

5. The rotor locking device according to claim 1, wherein the locking hole and the end of the locking pin that is configured to fit into the locking hole each have a rectangular cross section.

6. The rotor locking device according to claim 3, wherein in a case that the locking pin is locked in the locking hole, the locking hole and the locking pin have the same size on the same cross-section in a direction perpendicular to the radial direction of the rotor connecting disc.

7. The rotor locking device according to claim 1, wherein a protection cover is mounted at a second end of the limiting rod.

8. The rotor locking device according to claim 1, wherein a diameter of the limiting hole on the locking pin mounting plate is greater than a diameter of the limiting rod.

9. A wind generator, comprising a base and a rotor locking device, wherein the rotor locking device is connected to the base, and the rotor locking device comprises:
- a locking hole provided on a rotor connecting disc and a locking pin configured to fit into the locking hole, and the locking pin is connected to the base of the wind generator, wherein in a case that the locking pin is locked in the locking hole, a radial clearance is provided between the locking pin and the locking hole in a radial direction of the rotor connecting disc,
- a limiting rod for limiting a circumferential rotation of the locking pin and
- a locking pin mounting plate fixedly connected to the base, wherein:
the limiting rod penetrates the locking pin mounting plate through a limiting hole on the locking pin mounting plate,
a first end of the limiting rod is inserted into the locking pin, and
the limiting rod is movable in the limiting hole on the locking pin mounting plate in a longitudinal direction of the limiting rod.

10. The rotor locking device according to claim 4, wherein in a case that the locking pin is locked in the locking hole, the locking hole and the locking pin have the same size on the same cross-section in a direction perpendicular to the radial direction of the rotor connecting disc.

11. The rotor locking device according to claim 5, wherein in a case that the locking pin is locked in the locking hole, the locking hole and the locking pin have the same size on the same cross-section in a direction perpendicular to the radial direction of the rotor connecting disc.

12. The wind generator according to claim 9, wherein a locking sleeve is fixedly connected to the rotor connecting disc, and the locking hole is formed on the locking sleeve.

13. The wind generator according to claim 9, wherein an end of the locking pin that is configured to fit into the locking hole is of a wedge shape.

14. The wind generator according to claim 13, wherein two outer surfaces of the locking pin which are parallel to the radial direction of the rotor connecting disc are inclined surfaces.

15. The rotor locking device according to claim 1, wherein when the rotor locking device is in operation, a second end of the limiting rod is not released from the locking pin mounting plate after the limiting rod is adjusted to a suitable locking position with the locking pin.

16. The wind generator according to claim 9, wherein when the rotor locking device is in operation, a second end of the limiting rod is not released from the locking pin mounting plate after the limiting rod is adjusted to a suitable locking position with the locking pin.

* * * * *